March 20, 1934.　　E. A. RUSSELL ET AL　　1,951,630
WATER RETURN VAPOR REGULATOR
Original Filed Dec. 13, 1929　　2 Sheets-Sheet 1
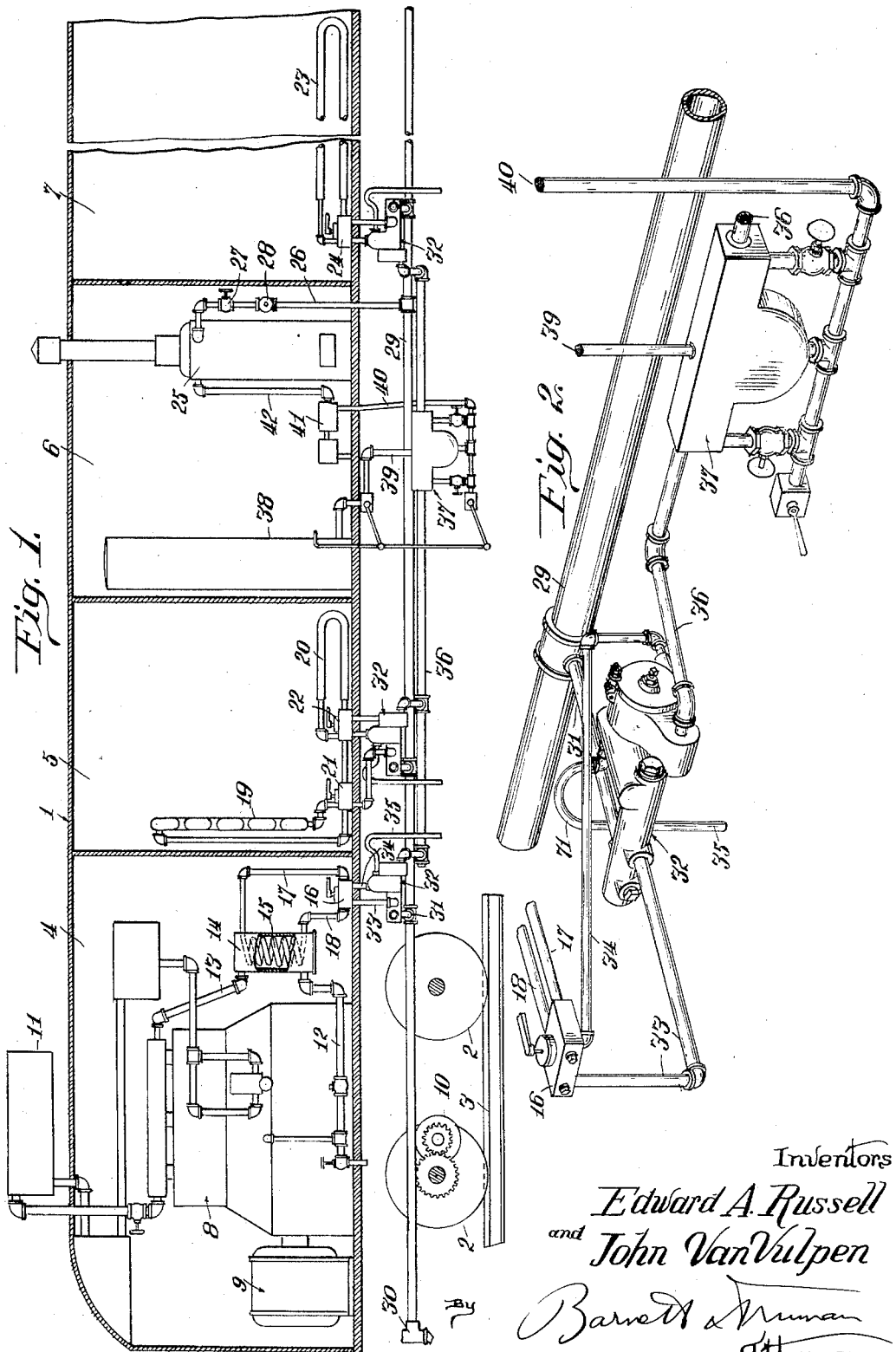
Inventors
Edward A. Russell
and John VanVulpen
By Barnett & Truman
Attorneys.

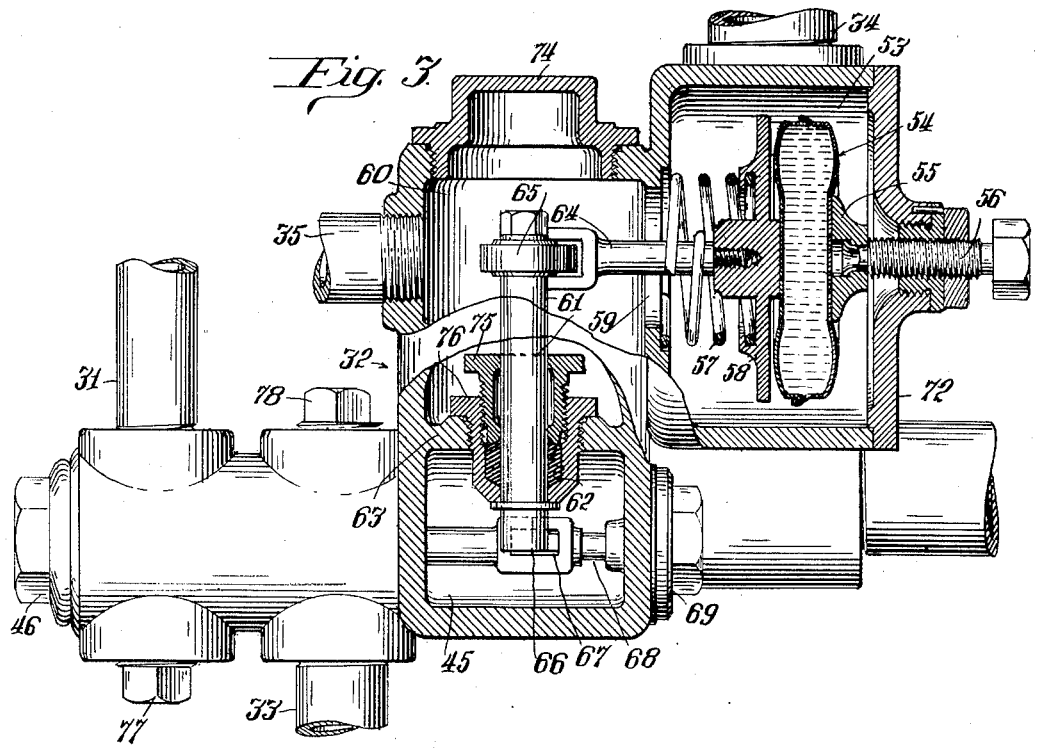
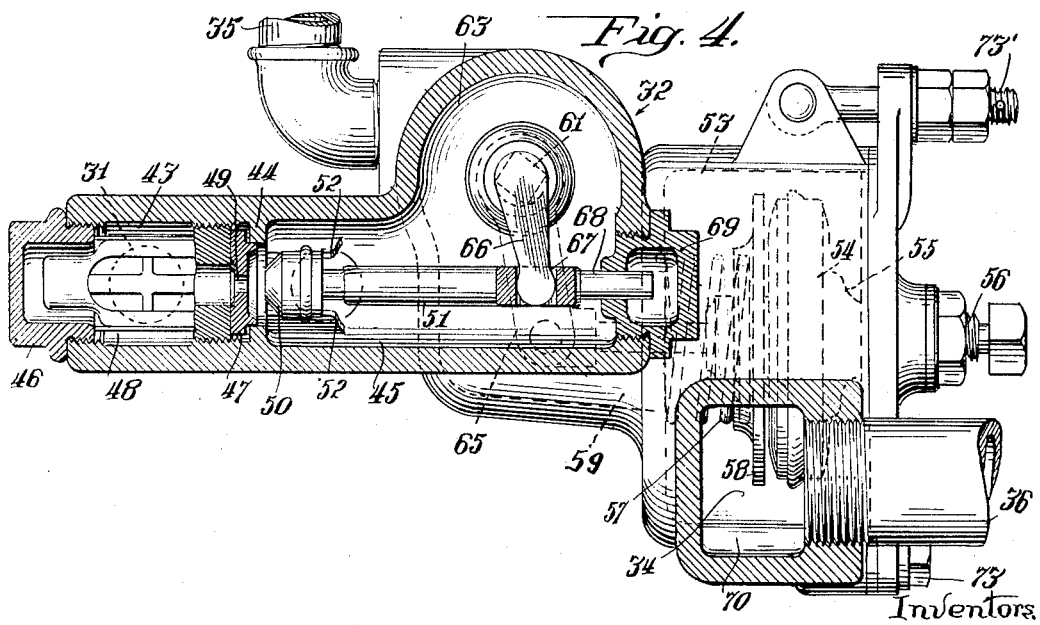

Patented Mar. 20, 1934

1,951,630

UNITED STATES PATENT OFFICE 1,951,630

WATER RETURN VAPOR REGULATOR

Edward A. Russell and John Van Vulpen, Chicago, Ill., assignors to Vapor Car Heating Company, Inc., Chicago, Ill., a corporation of New York Original application December 13, 1929, Serial No. 413,872. Divided and this application August 5, 1932, Serial No. 627,582

4 Claims. (Cl. 236—40)

This invention relates to certain new and useful improvements in a vapor regulator for controlling the flow of vapor or steam to the radiators or heat distributing elements of a railway car heating system, and more particularly to a vapor regulator adapted to collect and return the condensate which flows back from the heating system.

Vapor regulators, as well known in the art, comprise a valve located in the steam supply line, and a thermostatic element for controlling the valve, said thermostatic element being subject to the temperatures of the fluids returned from the radiators. The vapor regulator is usually positioned beneath the car and the thermostatic element is substantially enclosed in a housing through which the return steam, air and some or all of the condensates pass before being vented through an opening in the lower end of the housing. This housing serves to enclose the thermostatic element in a surrounding envelope of the returned fluid so that it will respond promptly to the temperature thereof. Ordinarily the condensate is permitted to drain out beneath the car either before or after the returned fluids have passed through the thermostat chamber.

According to the present invention, all portions of the regulator are enclosed and means is provided for holding and conserving the returned condensate so that it may be returned to the water supply tank or the steam generator. The vapor regulator is provided with a vent to permit the escape of non-condensable gases and maintain the return side of the system under substantially atmospheric pressure, but this vent is so arranged that the loss of steam or condensate is avoided.

The principal object of this invention is to provide an improved vapor regulator, such as briefly described hereinabove and disclosed more in detail in the specifications which follow.

Another object is to provide a vapor regulator adapted to collect and return the condensate from the heating system.

Another object is to provide a vapor regulator which is compact and of a minimum height so that the condensate may be drained from the regulator by gravity into a suitable sump or collection vessel which is carried at a somewhat lower level beneath the car.

Other objects and advantages of this invention will be more apparent from the following detailed description of one approved form of apparatus constructed according to the principles of this invention.

In the accompanying drawings:

Fig. 1 is a longitudinal vertical section through a portion of a railway car showing diagrammatically the various elements of a heating system in which this improved vapor regulator is especially adapted for use.

Fig. 2 is a perspective view of a portion of the return water apparatus, including the improved vapor regulator.

Fig. 3 is a plan view, partially in horizontal section, of the improved vapor regulator.

Fig. 4 is a vertical section through the vapor regulator.

The present application is a division of the copending application of Russell and Van Vulpen for a Water return vapor heating system for rail motor cars, Serial No. 413,872, filed Dec. 13, 1929. In this prior application is disclosed and claimed a heating system for a self-propelled railway car provided with an internal combustion engine which drives a dynamo which in turn furnishes electric power for energizing the motors which operate the driving wheels. These cars operate as single units or with one or more trailers, and it is necessary that a self-contained heating system be provided for regulating the temperature of the car in cold weather. Since such cars may be used for comparatively long runs an undesirably large supply of water would have to be carried if the condensate were permitted to drain away from the heating system. In order to limit the amount of water used and thus secure considerable economies in space occupied and weight carried by the car, this improved vapor heating system has been designed to return all condensate from the radiating systems to the steam generator, whereby the reserve amount of water carried can be limited to that necessary to replace unavoidable losses through leakage of water or vapor.

Although the present application is concerned primarily with the improved vapor regulator, a brief description will first be given of the improved vapor heating system for which this vapor regulator was especially designed. It will be apparent, however, as the description proceeds that this vapor regulator is not limited to use in this particular heating system, nor is it limited to use in steam heating systems for railway cars. The improved regulator might be used in other systems using vapor or steam, or air conditioning apparatus, or other systems in which the collecting and return of condensate is desirable.

Referring first to Figs. 1 and 2, the railway car 1 is supported in the usual manner by the wheels 2 travelling on the rails 3. The car may be divided into a plurality of compartments comprising in the example here shown an engine room 4, a mail room 5, a baggage room 6, and a passenger compartment 7. The internal combustion engine 8 of any usual type is located in the engine room 4 and drives the dynamo 9 for supplying electric power to the motors 10 for propelling the car. The engine is provided with a cooling system including the radiator 11 positioned outside the car, and an auxiliary shunt circuit also extends from the engine jacket through pipes 12 and 13 to a tank 14 in which is a heating coil 15 so that the water in the motor cooling system may be heated when necessary in cold weather, or to facilitate starting the engine. Steam or vapor is supplied through the heating coil 15 from a distributing valve 16, the steam flowing through supply pipe 17 and returning through pipe 18. Radiators 19 and 20 are positioned in mail room 5, these radiators being supplied with steam through the distributing valves 21 and 22, respectively. A radiator 23 is shown in the passenger compartment 7, this radiator being supplied with steam or vapor through the distributing valve 24.

The steam generator or boiler 25 for supplying steam to the heating system is positioned, in the example here shown, in the baggage room 6. This generator may be of any approved type and the steam generated therein is delivered through pipe 26 provided with stop valve 27 and reducing valve 28 into the train line supply pipe 29 which is supported beneath the car and extends from end to end thereof. At each end of the car the train line pipe 29 is provided with an end valve 30 of usual form, which is normally closed but may be opened to make connections for delivering steam to the similar heating system on a trailer, if a trailer is used.

Steam or vapor at substantially atmospheric pressure is supplied to each of the several radiators or groups of radiators, and also to the heating coil 15, through improved vapor regulators of the type hereinafter more specifically described, and control or distributing valves of the general type disclosed in a number of prior patents, for example, the patent to Russell Reissue 15,965, dated December 16, 1924. It will be understood that all of the distributing valves hereinabove referred to, namely valves 16, 21, 22, and 24 may be of the same type, as also are the several vapor regulators with which the different valves are associated.

The several units for supplying vapor from the train line supply pipe 29 to the respective radiators or heaters in each compartment are substantial duplicates of one another and a description of one will suffice for all, and for this purpose a reference will be made principally to Fig. 2. Steam flows from the train pipe 29 through the branch steam pipe 31 into the improved vapor regulator indicated generally at 32. From the vapor regulator, vapor is supplied at substantially atmospheric pressure through supply pipe 33 to the distributing valve, here shown by way of example as the valve 16. From the distributing valve the steam flows through pipe 17 to the radiator or heater and returns through pipe 18 to the distributing valve and thence through pipe 34 back to the vapor regulator 32. Non-condensable gases are vented through the pipe 35 and the condensate collected in the vapor regulator drains through pipe 36 into an improved collector or sump 37, described in detail in the parent application hereinabove referred to. The water tank or reservoir 38 which may be positioned in the baggage room 6 is connected through pipe 39 with the sump 37 and a delivery pipe 40 leads from the sump to the water feed pump 41 which forces water through pipe 42 into the boiler or generator 25. All of the drain pipes 36 from the several vapor regulators lead into the common sump 37 from which the water is returned to the boiler, and sufficient additional water is supplied from reservoir 38 through pipe 39 to meet the requirements of the system. This improved heating system is disclosed more in detail and claimed in the parent application Serial No. 413,872, hereinabove referred to.

The improved vapor regulator forming the particular subject matter of this present application will now be described, referring more particularly to Figs. 2, 3 and 4. The regulator comprises a closed housing 32 divided by internal webs into a plurality of chambers as hereinafter described, all of the moving parts of the regulator being entirely enclosed within the housing. The steam pipe 31 leads into the steam chamber 43 which is separated by a vertical web 44 from the vapor-supply chamber 45 and is closed at its other end by the screw plug 46. A valve seat 47 is mounted in the web 44, and the steam flows from chamber 43 through strainer 48 and valve opening 49 into the vapor supply chamber 45. A movable valve member 50 carried by valve stem 51 is slidable between guides 52 toward or away from the valve seat 47 so as to control the flow of steam through the port or opening 49. The chamber 45 is closed except for the port leading to outlet pipe 33 which delivers the vapor to the distributing valve 16.

The pipe 34 leading back from the valve 16 delivers the returned fluids (steam, condensate and non-condensable gases) into the closed return chamber 53 in which is housed the temperature responsive element 54, said element comprising as usual a flexible closed vessel containing a quantity of expansible fluid. The fluid containing vessel will expand a determined amount when surrounded by an envelope of steam or vapor, and will contract correspondingly when surrounded by a cooler fluid, such as air or condensate. One side of vessel 54 abuts against a retaining head 55 carried by an adjusting screw 56 extending out through one closed wall of chamber 53. The vessel must expand in the opposite direction, this movement being opposed by a compression spring 57 confined between the opposite wall of chamber 53 and an abutment plate 58 bearing on the side of vessel 54 opposite from that engaged by head 55. An auxiliary return chamber 60 positioned somewhat higher than the chamber 53, communicates with chamber 53 through the opening 59 (see dotted lines Fig. 4). A rock-shaft 61 projects through the sealing assembly 62 mounted in the vertical web 63 which separates auxiliary return chamber 60 from the vapor supply chamber 45. A stem 64 is connected at one end with the plate 58, projects through the opening 59 into chamber 60, and is pivotally connected at its opposite end with the crank arm 65 projecting downwardly from rock shaft 61 (see dotted lines Fig. 5). A crank arm 66 formed on the other end of rock shaft 61 projects downwardly into a slot 67 formed in the valve stem 51. The end 68 of valve stem 51 remote from the valve 50 is slidably guided in a screw plug 69 mounted in one wall of housing 32.

The lower portion of return chamber 53 is in open communication with a sump chamber 70 positioned somewhat below the level of the return chamber so that condensate will drain thereinto. The drain pipe 36 through which the condensate is returned to the main collection pump 37 leads from sump chamber 70.

The vent pipe 35 leads from the upper portion of auxiliary return chamber 60, is first looped upwardly, as shown at 71, (Fig. 2) and then projects downwardly with its outer end open to the atmosphere. The non-condensable gases which collect in auxiliary return chamber 60 will be vented through this pipe 35, but obviously no condensate can find its way out through this pipe loop.

This vapor regulator operates in substantially the same manner as other devices of this kind, as heretofore known. The steam flows in from the train pipe 29 through branch steam pipe 31, thence through the valve opening 49 and out through supply pipe 33 to the radiating system. The fluids return from the radiating system through pipe 34 into the return chamber 53. When the radiating system is filled with steam so that steam returns and fills chamber 53, the thermostatic element 54 will expand and through the connections hereinabove described will move the valve member 50 to closed position, thus cutting off the further flow of steam from the supply to the radiators. When the steam has condensed (at least in the return line) the thermostatic element 54 will contract, thus opening the valve and admitting further steam into the radiating system.

It will be noted that the vapor regulator is entirely closed, except for the several inlet and outlet pipe connections so that there can be no loss of fluids therefrom, with the exception of the non-condensable gases which are vented through the upwardly looped pipe 35. This open vent pipe keeps the vapor regulator under substantially atmospheric pressure, while at the same time preventing the loss of any substantial amount of water or watery vapor. It will be apparent that the steam which finds its way into return chamber 53 will condense and flow into sump 70. Any small portion of the steam which passes through restricted opening 59 into the auxiliary return chamber 60, or into the lower portion of the looped pipe 35 will drain back through the several chambers into the sump 70, and then be returned through pipe 36 to the steam-generating system.

It will be noted that the several chambers are, in general, positioned in horizontal prolongation of one another so as to minimize as far as practicable the vertical height of the vapor regulator. In this manner the sump 70 into which the water drains is positioned as high as possible so that water can drain by gravity from this sump chamber into the collecting sump 37.

While the housing 32 for this vapor regulator is in the form of a single casting (in the form here shown) and the chambers have been described as entirely closed, it will be understood that removable plugs or closures are provided whereby easy access is obtained to all of the working parts within the regulator. The rear wall of return chamber 53 is in the form of a removable closure plate 72 held in place by the bolts 73 and 73'. By removing the closure 72, the thermostatic element 54 and associated parts in return chamber 53 may be removed and replaced. By removing the screw plugs 46 and 69, hereinabove described, access is obtained to both ends of the aligned steam chamber 43 and supply chamber 45. A removable plug 74 closes one end of auxiliary return chamber 60, and through this chamber access is obtained to the screw plug 76 and gland 75 forming parts of the packing assembly 62 in which rock shaft 61 is mounted. In order to facilitate the installation of this vapor regulator in a variety of different positions relative to the piping system, alternative threaded ports for receiving the steam pipe 31 and delivery pipe 33 are provided in opposite sides of the chambers 43 and 45, respectively. The ports not used are closed by screw-plugs 77 and 78.

Although this improved vapor regulator has been described as used in connection with the return-water vapor car heating system for use in which it was especially designed, it will be apparent that this vapor regulator could be used in many other types of heating systems, or air-conditioning systems, or other types of apparatus in which condensed liquids are to be collected and returned into the circulating system.

We claim:

1. A vapor regulator comprising a closed housing divided into a steam chamber in communication with a source of steam supply, a vapor supply chamber from which vapor is delivered to a radiating system, a return chamber to which vapor and condensate is returned from the radiating system, and a sump chamber positioned at a lower level than the return chamber and in communication therewith, the housing being formed with ports leading into each of the respective chambers with which ports pipe connections are established for delivering the fluids to or from the respective chambers, there being a valve opening between the steam and supply chambers, a movable valve member for controlling the flow of steam through this opening, a temperature responsive element in the return chamber, means for operating the valve member in response to movements of the temperature responsive element, and an open vent pipe for gases communicating with an upper portion of the return chamber.

2. A vapor regulator comprising a closed housing divided into a steam chamber in communication with a source of steam supply, a vapor supply chamber from which vapor is delivered to a radiating system, a return chamber to which vapor and condensate is returned from the radiating system, and a sump chamber positioned at a lower level than the return chamber and in communication therewith, the housing being formed with ports leading into each of the respective chambers with which ports pipe connections are established for delivering the fluids to or from the respective chambers, there being a valve opening between the steam and supply chambers, a movable member for controlling the flow of steam through this opening, a temperature responsive element in the return chamber, means for operating the valve member and an open vent pipe leading upwardly from an upper portion of the return chamber and then looped downwardly so as to maintain the chamber under atmospheric pressure without permitting the escape of condensate.

3. A vapor regulator comprising a closed housing divided into a steam chamber in communication with a source of steam supply, a vapor supply chamber from which vapor is delivered to a radiating system, a return chamber to which vapor and condensate is returned from the radiating system, and a sump chamber positioned at a lower level than the return chamber and in communication therewith, the steam chamber and the supply chamber being positioned in substantially horizontal alignment and separated by a vertical web formed with a valve opening, a movable valve member guided within the supply chamber to open or close the valve opening, a steam supply pipe leading into the steam chamber, a vapor delivery pipe leading from the supply chamber, a return pipe leading into the return chamber, a temperature responsive element in the return chamber, there being a vertical web within the housing separating the supply chamber from the return chamber, operating connections between the temperature responsive element and the movable valve member comprising a member extending through the last mentioned web, packing means to prevent the flow of fluids through the web about this member, a drain pipe leading from the sump chamber to deliver condensate to a place of collection, and an open vent pipe leading from an upper portion of the return chamber.

4. A vapor regulator comprising a closed housing divided into a steam chamber in communication with a source of steam supply, a vapor supply chamber from which vapor is delivered to a radiating system, a return chamber to which vapor and condensate is returned from the radiating system, and a sump chamber positioned at a lower level than the return chamber and in communication therewith, the steam chamber and the supply chamber being positioned in substantially horizontal alignment and separated by a vertical web formed with a valve opening, a movable valve member guided within the supply chamber to open or close the valve opening, a steam supply pipe leading into the steam chamber, a vapor delivery pipe leading from the supply chamber, a return pipe leading into the return chamber, a temperature responsive element in the return chamber, there being a vertical web within the housing separating the supply chamber from the return chamber, operating connections between the temperature responsive element and the movable valve member comprising a member extending through the last mentioned web, packing means to prevent the flow of fluids through the web about this member, a drain pipe leading from the sump chamber to deliver condensate to a place of collection, and an open vent pipe for gases leading upwardly from an upper portion of the return chamber and then looped downwardly so as to maintain atmospheric pressure in the return chamber and vent gases without permitting the escape of condensate.

EDWARD A. RUSSELL.
JOHN VAN VULPEN.